(Model.)
W. E. CRANE.
Steam Engine Governor.
No. 233,734. Patented Oct. 26, 1880.
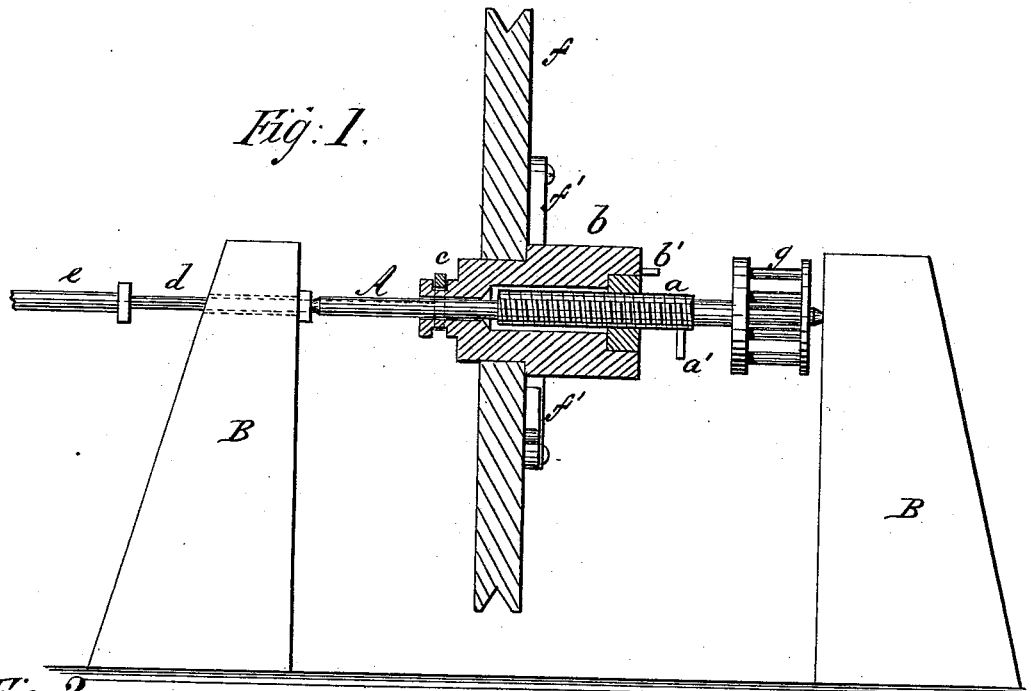
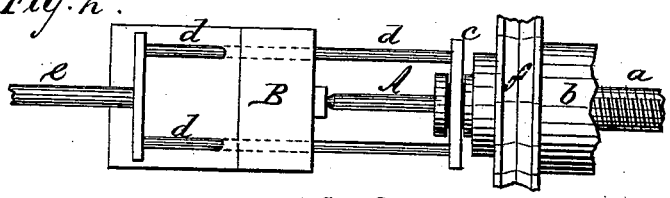
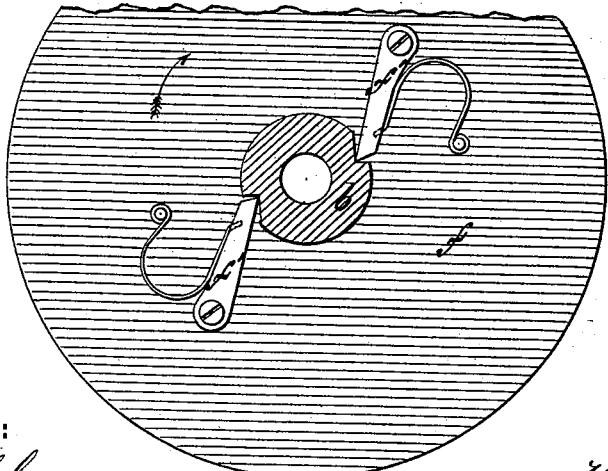
WITNESSES:
A. Schehl,
C. Sedgwick.
INVENTOR:
W. E. Crane
BY Munn & Co.
ATTORNEYS.

UNITED STATES PATENT OFFICE.

WALTER E. CRANE, OF ALMA CITY, MINNESOTA.

STEAM-ENGINE GOVERNOR.

SPECIFICATION forming part of Letters Patent No. 233,734, dated October 26, 1880.

Application filed March 3, 1880. (Model.)

*To all whom it may concern:*

Be it known that I, WALTER E. CRANE, of Alma City, in the county of Waseca and State of Minnesota, have invented a new and useful Improvement in Steam-Engine Governors, of which the following is a specification.

The object of my invention is to dispense with all devices depending on centrifugal action or the force of gravity for their operation in the regulation of the speed of steam-engines or other motors; and my invention consists in a governor wherein the straight-line movement for regulation of speed is obtained by the variations in speed between mechanism operated by the engine and mechanism moved by a separate motor at a regulated speed.

In carrying out my invention I make use of a screw and nut connected with the valve-rod, the screw and nut being turned in the same direction—one by connections from the engine and the other by connections from a separate motor, preferably a spring or weight, regulated by a pendulum. The travel of the screw and nut with relation to each other is dependent on their variations in speed, and the valve is opened and closed in proportion as the speed of the engine decreases or increases below or above the normal point at which the separate motor is set.

My invention is shown in the accompanying drawings, forming part of this specification, wherein—

Figure 1 is a sectional elevation of a governor embodying my invention. Fig. 2 is a plan view, showing the connections to the valve-rod. Fig. 3 is a face view of the pulley and nut, showing the manner of connecting them.

Similar letters of reference indicate corresponding parts.

A is a shaft, supported in suitable bearings in blocks B, and having one portion of its length formed with a screw, $a$, which thread will preferably be formed with square edges.

$b$ is a nut or a tubular block fitted with a nut at one end of its central aperture upon the shaft A and engaging with the screw $a$. At one end the nut or block $b$ is formed with an annular groove on its outer surface, with which groove a cross-head, $c$, engages, and from the head $c$ extend rods $d$, that are connected with a rod, $e$, that may represent the valve-rod or be connected therewith. This construction permits longitudinal movement of head $c$ and rod $e$ with the nut as the latter turns on the screw.

Upon the nut $b$ is fitted a pulley, $f$, that is provided with spring-pawls $f'$, engaging with recesses in nut $b$, so that the pulley will turn the nut $b$ when driven in one direction, and the nut may slip, as hereinafter described. The pulley $f$ is to be driven by a belt from the engine-shaft in any desired manner.

Upon the shaft A is a pinion, $g$, that is to be connected with clock-work driven by a spring or weight.

In operation, assuming the normal speed desired for the engine to be two hundred revolutions per minute, thereby turning the pulley $f$, say, twenty-five revolutions in the same time, the clock-work will be adjusted to turn the shaft A in the same direction twenty-five times a minute. With this adjustment, so long as the engine runs at the normal speed, the shaft A and nut $b$ will simply turn together; but in case the engine gains or loses in speed the nut will move endwise on the screw $a$ and move the valve-rod.

To stop the movement of the valve-rod when the valve is fully opened, I provide the nut $b$ with a pin or projection, $b'$, and the screw $a$ with a radial pin, $a'$, and arrange the connections so that the movement of nut $b$ in opening the valve is toward the projection $a'$. As soon as the pins $a'$ $b'$ engage, the nut is carried around by the screw, and if the engine still continues to run below the normal speed the pawls $f'$ allow the nut to slip in the pulley $f$.

This governor may be applied to any engine or machine for regulation of speed, and is also applicable to marine engines.

I do not limit myself to the details of construction exactly as shown and described, as it is evident that they may be varied without departing from my invention.

Having thus described my invention, I claim as new and desire to secure by Letters Patent—

The combination of the shaft A, having screw $a$, the pinion $g$, and radial pin $a'$, the notched nut or tubular block $b$, having pin $b'$, the cross-head $c$, the rod $e$, and the loose pulley $f$, having spring-pawls $f'$, as and for the purpose specified.

WALTER ELIPHALET CRANE.

Witnesses:
 CALVIN E. CRANE,
 CHARLES H. WILKINS.